United States Patent [19]

Hoinash

[11] 4,033,009
[45] July 5, 1977

[54] HANDLES FOR SUPPORTING A DISH OR THE LIKE IN A MICROWAVE OVEN

[75] Inventor: Lynne E. Hoinash, Brighton, Mass.

[73] Assignee: Sage Laboratories, Inc., Natick, Mass.

[22] Filed: Apr. 9, 1976

[21] Appl. No.: 675,512

Related U.S. Application Data

[63] Continuation of Ser. No. 544,295, Jan. 27, 1975, abandoned.

[52] U.S. Cl. .......................... 16/114 R; 248/145.6; 224/45 P; 294/27 H
[51] Int. Cl.² ......................................... A47J 45/07
[58] Field of Search ............ 16/116 R, 124, 114 R, 16/114 A; 248/145.6; 224/45 P, 46 T, 48 R; 294/27 R, 27 H

[56] References Cited

UNITED STATES PATENTS

| 2,487,559 | 11/1949 | Kraemer | 16/114 A |
| 2,767,565 | 10/1956 | Ernst | 294/27 R |
| 3,107,389 | 10/1963 | Engelbrecht | 16/124 |
| 3,112,948 | 12/1963 | Burns | 224/45 P |

Primary Examiner—Andrew V. Kundrat
Attorney, Agent, or Firm—Wolf, Greenfield & Sacks

[57] ABSTRACT

A pair of similarly-shaped handles support a dish or other food holder. The handles are of sufficient height to elevate the dish above a shelf of a microwave oven upon which the base of the handles rests. The handles permit easy carrying of the dish and each handle is double-ended with two accommodating slots preferably of slightly different dimension so that the handle can be selectively fitted with the dish.

8 Claims, 5 Drawing Figures

HANDLES FOR SUPPORTING A DISH OR THE LIKE IN A MICROWAVE OVEN

This is a continuation of application Ser. No. 544,295, filed Jan. 27, 1975 now abandoned.

BACKGROUND OF THE INVENTION

The present invention relates, in general to handles for a dish or other food holder. More particularly, the present invention pertains to handles for supporting a dish in a microwave oven.

Food that is to be cooked in a microwave oven is typically contained in a Pyrex platter or dish. This type of a dish is transparent to the microwave energy but the dish may still become hot and thus it is desirable to provide handles for opposite ends of the dish which can be used for carrying the dish and also for supporting the dish above a shelf of the over and in a position wherein uniform heating of the food can take place.

The Pyrex dish or platter may typically have an oval shape and thus the handle may be constructed to have a slot for fitting with one of the edges of the dish. However, it has been found that because the dishes may be made with different width edges, many times the handle will either fit too loosely or too tightly. In particular, if the handle is too loose this is dangerous and the platter or dish may be inadvertently dropped.

Accordingly, it is an object of the present invention to provide a handle for a dish which is securely fitted to the dish.

SUMMARY OF THE INVENTION

To accomplish the foregoing and other objects of this invention there is provided a pair of handles for a dish or the like food holder for supporting the dish preferably in a microwave oven. Each of the handles comprises opposite end sections and an interconnecting center section. Each of the end sections have means defining a slot or channel for receiving an edge of the dish. In the disclosed embodiment, the dish is of oval shape and thus the slot is arcuate. In order to provide improved fitting of the handle to the dish the slots of the opposite end sections are slightly different widths. Thus, if the end having the larger slot is fitted to the dish and the fit is loose, then the handle may be reversed with the opposite slot fitting with the dish in a more secure manner.

BRIEF DESCRIPTION OF THE DRAWINGS

Numerous other objects, features and advantages of the invention should now become apparent upon a reading of the following detailed description taken in conjunction with the accompanying drawings in which.

DETAILED DESCRIPTION

Figure 1:
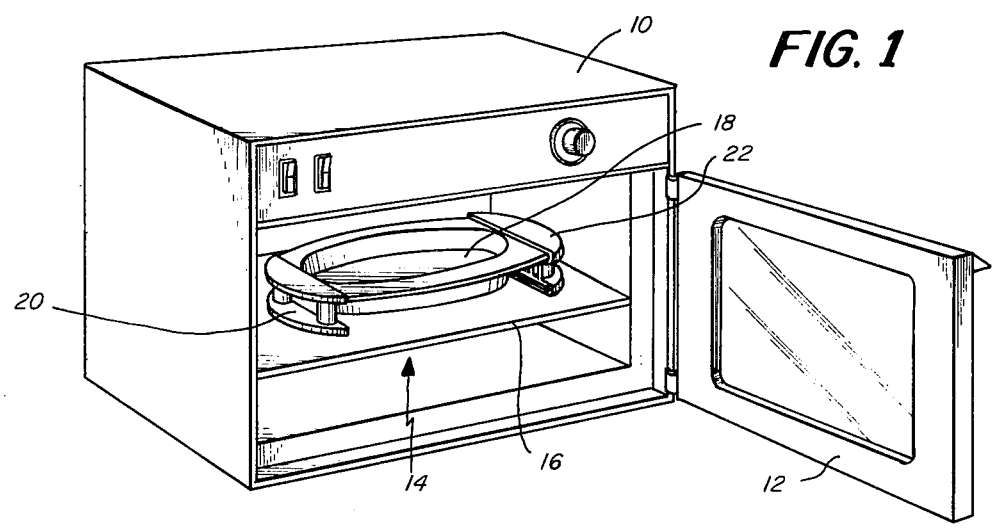
FIG. 1 is a perspective view showing a food dish supported by the handles of this invention in a microwave oven.

FIG. 1 shows a microwave oven 10 with its door 12 open to expose the interior cavity 14 of the oven. A shelf 16 is suitably supported within the cavity 14. A food plate or dish 18 which may include a cover for the dish, is supported by the handles 20 and 22. It is noted in FIG. 1 that the handles 20 and 22 function both as carrying handles are as means for supporting the dish above the shelf 16.

The handles 20 and 22 may be constructed substantially identically and one of the handles is shown in detail in FIGS. 2-5. The handles are preferably constructed of a plastic material which is transparent to the microwave energy and when the food is cooked even though the food is hot, the handles are not hot and can be touched. Thus, the food plate can be immediately removed from the oven after the food has been cooked.

Figure 2:
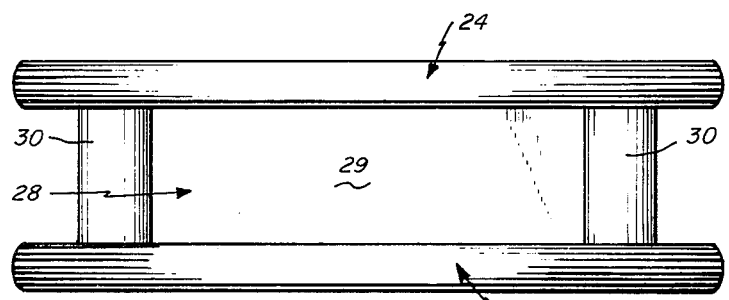
FIG. 2 is a front view of one of the handles shown in FIG. 1.
Figure 3:
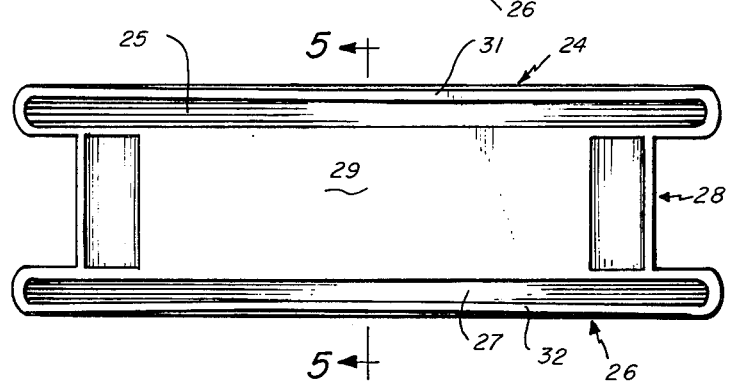
FIG. 3 is a rear view of the handles shown in FIG. 2.

The handles shown in FIGS. 2-5 generally comprises a top section 24, a bottom section 26 and an interconnecting intermediate section 28. The top and bottom sections 24 and 26 may be of substantially identical design and may have an arcuate shape as shown in the plan view of FIG. 4. As shown in FIG. 3, the top section 24 defines a slot 25 and the bottom section 26 defines a slot 27. The intermediate section 28 comprises a flat wall 29 and a pair of semi-circular supports 30. The wall 29 may be of different heights depending upon the particular dish that the handle is being used with.

In FIGS. 2 and 3, the handle has been described as comprising a top section 24 and a bottom section 26 each of which defines a slot for receiving the edge of the plate a shown in FIG. 1. Thus, the slot 25 receives the edge of the plate and the bottom section 26 functions as a base. Similarly, the handle can easily be inverted so that the top section 24 defines the base and then the slot 27 fits with the plate or other food holder.

In accordance with the present invention an objective is to provide a suitable fit of the handle to the edge of the dish. As previously mentioned, because the thickness of the edge of the dish may come within some predetermined tolerances it is desirable to make the slots 25 and 27 of slightly different width. Also, as shown in FIG. 3, the top wall 31 which in part defines the slot 25 and the bottom wall 32 which in part defines the slot 27 are slightly bowed, or as depected in FIG. 5 in that cross-sectional view a slight taper is shown. Because the handles are made of plastic the walls 31 and 32 may slightly deflect against the bias provided by the bowing of these walls.

Figure 5:
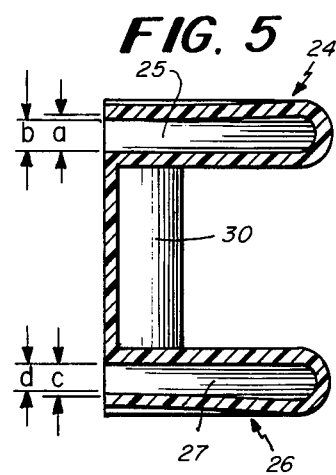
FIG. 5 is a cross-sectional view taken along line 5-5 of FIG. 3.
Figure 4:
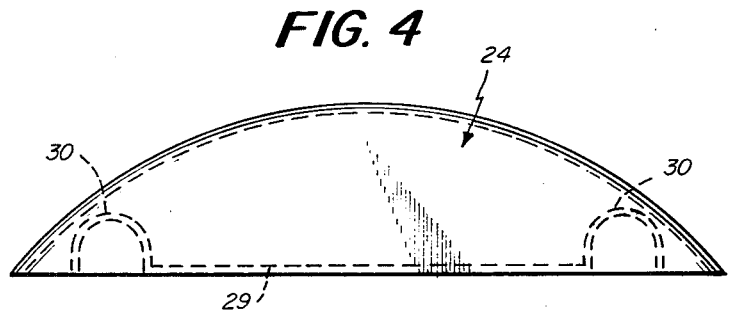
FIG. 4 is a top view of the handles shown in FIGS. 2 and 3.

In FIG. 5 the (a) and (c) dimensions represent the maximum width of the respective slots 25 and 27. The (b) and (d) dimensions shown in FIG. 5 represent the minimum slot widths at the center of the bow in the walls 31 and 32 and associated with the respective slots 25 and 27. The following are typical dimensions:

$a = 0.238$ inch
$b = 0.203$ inch
$c = 0.255$ inch
$d = 0.220$ inch

The difference between the (a) and (b) dimension or alternatively the (c) and (d) dimension may typically be 0.030 inch. The difference between the width of the slots 25 and 27 which may be represented by the dimensions (a) and (c) may be in the range of 0.001 inch to 0.033 inch and may typically be on the order of 0.017 inch.

Having described one embodiment or the handles of the present invention, it should now be apparent that numerous modifications can be made in the disclosed embodiment all of which are contemplated as falling within the spirit and scope of the present invention. For example, the interconnecting wall 29 may be made in different heights. The slots 25 and 27 may also be of a different width to accommodate a bigger or smaller dish. However, the difference in width of the slots should be similar to that disclosed in the embodiment shown in the drawings.

What is claimed is:

1. A handle for a dish or the like food container for supporting the dish in a microwave oven, said handle comprising opposite end sections and an interconnecting section, each end section having means defining a slot for receiving an edge of the dish, wherein the slots of the opposite end sections are close to but of a different width to permit selective fitting of the handle to the dish, said opposite end sections each including a bowed wall defining said slot so that said slot has a maximum and minimum width.

2. A handle as set forth in claim 1 wherein the difference between said maximum and minimum widths is on the order of 0.030 inch.

3. A handle as set forth in claim 1 wherein each slot has a minimum width that differs from the minimum width of the other slot by a dimension on the order of 0.017 inch.

4. A handle as set forth in claim 3 wherein each said slot is arcuate and of a shape to match the shape of the edge of the dish.

5. A handle as set forth in claim 4 wherein the interconnecting section comprises a wall and a pair of reinforcing columns.

6. A handle for a dish or the like food container for supporting the dish in a microwave oven, said handle comprising opposite end sections and an interconnecting section, each end section having means defining a slot for receiving an edge of the dish, wherein the slots of the opposite end sections are of slightly different width to permit selective fitting of the handle to the dish, said slots of each section being formed independently with the space therebetween defined by the intermediate section being sufficient to permit the handle to serve as a stand with one end section accommodating the dish while the other end section serves as a resting base, said opposite end sections each including a pair of facing walls defining each slot with one of the facing walls of each end section being tapered relative to the other wall.

7. A handle for a dish or the like food container for supporting the dish in a microwave oven, said handle comprising opposite end sections and an interconnecting section, each end section having means defining a slot for receiving an edge of the dish, wherein the slots of the opposite end sections are of slightly different width to permit selective fitting of the handle to the dish, said slots of each section being formed independently with the space therebetween defined by the intermediate section being sufficient to permit the handle to serve as a stand with one end section accommodating the dish while the other end section serves as a resting base, wherein the difference in the width of the slots is on the order of 10% of one of the slots or less.

8. A handle for a dish or the like food container for supporting the dish in a microwave oven, said handle comprising opposite end sections and an interconnecting section, each end section having a pair of facing walls defining a slot for receiving an edge of the dish, said pairs of facing walls defining four separate walls each and every one of which is spaced from its adjacent wall the facing walls being supported so that the slot openings of the slots are close to but of a different width to permit selective fitting of the handle to the dish with either slot for accommodating the dish, said slots of each section being formed independently with the space therebetween defined by the interconnecting section being sufficient to permit the handle to serve as a stand with one end section for accommodating the dish while the other end section serves as a resting base, said interconnecting section comprising wall means disposed orthogonally to the facing walls for spacedly separating the facing walls of one end section from the facing walls of the other end section and connecting from an edge of a facing wall defining one slot to an edge of a facing wall defining the other slot.

* * * * *